US011710834B2

(12) United States Patent
Nakai et al.

(10) Patent No.: US 11,710,834 B2
(45) Date of Patent: Jul. 25, 2023

(54) LITHIUM PRIMARY BATTERY

(71) Applicant: Panasonic Intellectual Property Management Co., Ltd., Osaka (JP)

(72) Inventors: Miyuki Nakai, Osaka (JP); Yasuyuki Kusumoto, Hyogo (JP); Atsushi Fukui, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 70 days.

(21) Appl. No.: 16/981,118

(22) PCT Filed: Oct. 10, 2018

(86) PCT No.: PCT/JP2018/037639
§ 371 (c)(1),
(2) Date: Sep. 15, 2020

(87) PCT Pub. No.: WO2019/181027
PCT Pub. Date: Sep. 26, 2019

(65) Prior Publication Data
US 2021/0020957 A1 Jan. 21, 2021

(30) Foreign Application Priority Data
Mar. 23, 2018 (JP) .................. 2018-057054

(51) Int. Cl.
*H01M 6/16* (2006.01)
*H01M 4/06* (2006.01)
*H01M 6/02* (2006.01)

(52) U.S. Cl.
CPC ............. *H01M 6/168* (2013.01); *H01M 4/06* (2013.01); *H01M 6/02* (2013.01); *H01M 6/164* (2013.01)

(58) Field of Classification Search
CPC ............................................. H01M 6/14–168
See application file for complete search history.

(56) References Cited

U.S. PATENT DOCUMENTS

| 5,462,820 A * | 10/1995 | Tanaka ................. H01M 4/525 429/332 |
| 2002/0192565 A1 * | 12/2002 | Ueda ................. H01M 10/0569 429/231.1 |

(Continued)

FOREIGN PATENT DOCUMENTS

| CN | 104919641 A | 9/2015 |
| CN | 107710460 A | 2/2018 |

(Continued)

OTHER PUBLICATIONS

International Search Report dated Jan. 15, 2019, issued in counterpart International Application No. PCT/JP2018/037639. (1 page).

(Continued)

*Primary Examiner* — Matthew T Martin
*Assistant Examiner* — Unique Jenevieve Luna
(74) *Attorney, Agent, or Firm* — WHDA, LLP

(57) ABSTRACT

A lithium primary battery including: a battery case; an electrode group; and a nonaqueous electrolyte; the nonaqueous electrolyte contains a nonaqueous solvent, a solute, and an additive; the electrode group includes a positive electrode, a negative electrode, and a separator interposed therebetween; the negative electrode includes foil composed of metal lithium or a lithium alloy, has a shape extending in a longitudinal direction and a short direction, and provided with a long tape adhered to at least one main surface of the negative electrode along the longitudinal direction thereof; the tape includes a resin substrate and an adhesive layer and has a width of 0.5 to 3 mm; and the additive is a lithium salt represented by the following formula (1): $Li_xMC_yO_zF_\alpha$ ($1 \le x \le 2$, $0 \le y \le 6$, $0 \le z \le 8$, $0 \le \alpha \le 6$, and $1 \le y+z+\alpha$ are satisfied, (Continued)

and y and z are not simultaneously 0), and the element M includes at least one of phosphorus and boron.

8 Claims, 1 Drawing Sheet

(56) References Cited

U.S. PATENT DOCUMENTS

| | | | |
|---|---|---|---|
| 2015/0372349 A1* | 12/2015 | Shikita | C07C 309/65 558/56 |
| 2017/0358791 A1 | 12/2017 | Sugioka | |
| 2018/0131034 A1 | 5/2018 | Oura et al. | |

FOREIGN PATENT DOCUMENTS

| | | |
|---|---|---|
| JP | 61-281466 A | 12/1986 |
| JP | 2009-252681 A | 10/2009 |
| WO | 2016/195062 A1 | 12/2016 |

OTHER PUBLICATIONS

English Translation of Chinese Search Report dated Mar. 1, 2023, issued in counterpart CN application No. 201880078763.4. (3 pages).

\* cited by examiner

LITHIUM PRIMARY BATTERY

TECHNICAL FIELD

The present invention relates to a lithium primary battery.

BACKGROUND ART

In recent years, application fields of electronic apparatuses each using a lithium primary battery as a power source have been expanded, and in concomitance therewith, the battery tends to be used to drive an apparatus for a long time. In addition, for the electronic apparatus, the battery is required to work as expected in accordance with a designed capacity.

In a lithium primary battery which uses foil (hereinafter, referred to as "negative electrode foil") composed of metal lithium or a lithium alloy for a negative electrode, the negative electrode foil has two functions as a negative electrode active material and a negative electrode collector. In the battery as described above, at an end of discharge, lithium in the negative electrode foil is consumed, and hence, the function as the collector is degraded. As a result, an actual capacity tends to decrease smaller than the designed capacity.

Hence, PTL 1 has proposed that in a lithium primary battery in which a manganese dioxide is used for a positive electrode and a lithium negative electrode is used for a negative electrode, a long and thin tape is adhered to the lithium negative electrode in a longitudinal direction thereof. Accordingly, a dissolution reaction of the lithium negative electrode under the tape is suppressed during the discharge, and hence, the function as the collector can be maintained.

CITATION LIST

Patent Literature

PTL 1: Japanese Published Unexamined Patent Application No. 61-281466

SUMMARY OF INVENTION

In the case of the lithium primary battery disclosed in PTL 1, a nonaqueous electrolyte is liable to enter voids of an adhesive of the tape, and hence, the lithium negative electrode under the tape is liable to be in contact with the electrolyte. In addition, the nonaqueous electrolyte which enters the voids of the adhesive degrades an adhesive force at the interface between the negative electrode and the adhesive, and the tape is liable to float due to the peeling therebetween. At a floating portion, a larger area of the lithium negative electrode is in contact with the electrolyte, and as a result, the lithium negative electrode is eluted. Hence, at the discharge final stage, the function of the lithium negative electrode as the collector is degraded, and the capacity as designed is difficult to obtain.

A lithium primary battery according to an aspect of the present disclosure comprises: a battery case; an electrode group received in the battery case; and a nonaqueous electrolyte. In the lithium primary battery described above, the nonaqueous electrolyte contains a nonaqueous solvent, a solute, and an additive; the electrode group includes a positive electrode, a negative electrode, and a separator interposed therebetween, the positive electrode, the negative electrode, and the separator being spirally wound together; the negative electrode includes foil composed of metal lithium or a lithium alloy, has a shape extending in a longitudinal direction and a short direction, and is provided with a long tape adhered to at least one main surface of the negative electrode along the longitudinal direction thereof; the tape includes a resin substrate and an adhesive layer and has a width of 0.5 to 3 mm; and the additive is a lithium salt represented by the following formula (1)

where in the formula (1), $1 \leq x \leq 2$, $0 \leq y \leq 6$, $0 \leq z \leq 8$, $0 \leq \alpha \leq 6$, and $1 \leq y+z+\alpha$ are satisfied, y and z are not simultaneously 0, and the element M includes at least one of phosphorus and boron.

The present disclosure is able to provide a lithium primary battery in which even at a discharge final stage, the function as the collector of the negative electrode can be maintained.

DESCRIPTION OF EMBODIMENTS

Figure 1:
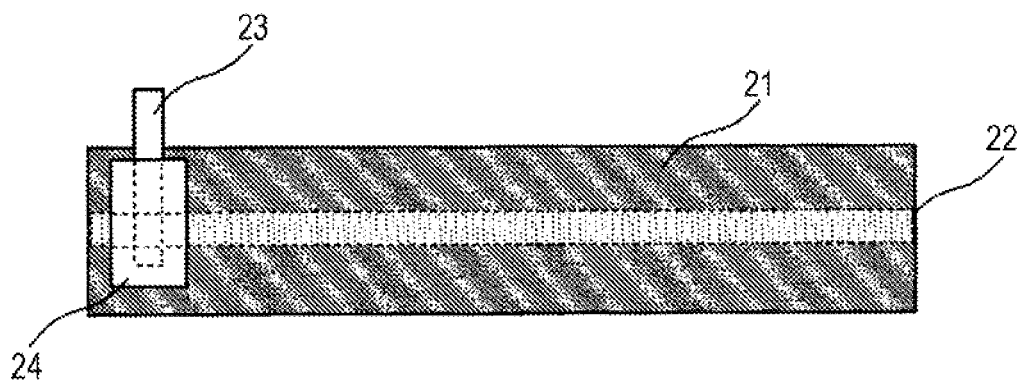
FIG. 1 is a view showing the structure of a negative electrode of a lithium primary battery according to an embodiment of the present invention.

In a lithium primary battery according to the present invention includes a battery case, an electrode group received in the battery case, and a nonaqueous electrolyte. The nonaqueous electrolyte contains a nonaqueous solvent, a solute, and an additive. The electrode group includes a positive electrode containing a manganese dioxide, a negative electrode formed from metal lithium or a metal lithium alloy, and at least one separator interposed between the positive electrode and the negative electrode. The positive electrode and the negative electrode are spirally wound with the separator interposed therebetween.

The negative electrode includes foil composed of metal lithium or a lithium alloy and has a shape extending in a longitudinal direction and a short direction. To at least one main surface of the negative electrode, a long tape is adhered along the longitudinal direction thereof. The tape includes a resin substrate and an adhesive layer. In a region of the negative electrode covered with the tape, since a dissolution reaction of the negative electrode during the discharge is suppressed, breakage of the negative electrode is not likely to occur even at a discharge final stage, and hence, the function as a collector can be maintained.

However, when the width of the tape is excessively large, the dissolution reaction of lithium during the discharge is inhibited, and a sufficient capacity may not be output in some cases. In order to obtain a lithium primary battery having a high capacity, the width of the tape is required to be limited to 3 mm or less. On the other hand, when the width of the tape is less than 0.5 mm, the function as the collector of the negative electrode is difficult to maintain. Hence, the width of the tape is limited to 0.5 to 3 mm.

The additive contained in the nonaqueous electrolyte is represented by the following formula (1).

In the formula (1), $1 \leq x \leq 2$, $0 \leq y \leq 6$, $0 \leq z \leq 8$, $0 \leq \alpha \leq 6$, and $1 \leq y+z+\alpha$ are satisfied. However, y and z are not simultaneously 0. $1 \leq z \leq 6$ and $1 \leq \alpha \leq 6$ are preferably simultaneously satisfied, and for example, $1 \leq z \leq 4$ and $1 \leq \alpha \leq 4$ are simultaneously satisfied. Furthermore, the element M includes at least one of phosphorus and boron. The additive as described above is recognized to function to inhibit the entry of the nonaqueous electrolyte in voids of the adhesive layer of the tape. Although a detailed mechanism has not been clearly understood, it is believed that since the additive and some component contained in the adhesive layer of the tape generate a certain reaction or have an interaction therebetween, the adhesion therebetween is improved. Accordingly, it is believed that since the generation of the voids caused by a decrease in adhesive force at the interface between the negative electrode and the adhesive layer is suppressed, floating of the resin substrate of the tape can be suppressed. Hence, the function to reduce consumption by discharge in the region of the negative electrode covered with the tape can be maintained for a long time.

As the additive which satisfies the above formula (1), for example, an oxoacid salt may be mentioned. According to the nomenclature of IUPAC (international Union of Pure and Applied Chemistry), the oxoacid indicates a compound which contains at least one oxygen atom, at least one element other than oxygen, and at least one hydrogen atom bonded to oxygen and which generates a conjugate base by releasing a proton. That is, the oxoacid salt indicates a compound having an oxoacid anion and a lithium ion. According to this definition, in an anion forming an oxoacid salt, an atom X may be either the element M or an element other than the element M. For example, a salt of a cation and an anion (such as $BF_2C_2O_4^-$) formed by bonding the element M or an atom group (such as $BF_2$) containing the element M to a dianion of oxalic acid (the atom X represents carbon) which is an oxoacid is also included in the oxoacid salt. In addition, a salt of a cation and an anion (such as $PF_2O_2^-$) formed by bonding element F to an anion of phosphoric acid (the atom X represents phosphorus) which is an oxoacid is also included in the oxoacid salt.

In addition, since the oxoacid anion is required to have oxygen to be bonded to the element M, a lithium salt, such as $LiPF_6$ or $LiBF_4$, which has been generally used as a solute of a lithium primary battery is not included in the oxoacid salt according to the present invention.

As the additive contained in the nonaqueous electrolyte, in particular, when the element M in the above formula (1) is phosphorus, lithium difluorophosphate ($LiPO_2F_2$), lithium monofluorophosphate ($Li_2PO_3F$), lithium tetrafluorooxalatophosphate ($LiPC_2O_4F_4$), or lithium difluorooxalatophosphate ($LiP(C_2O_4)_2F_2$) may be mentioned.

In addition, when the element M is boron, for example, lithium difluoroborate ($LiBF_2O$), lithium difluorooxalatoborate ($LiBC_2O_4F_2$), or lithium bisoxalatoborate ($LiB(C_2O_4)_2$) may be mentioned.

In order to improve the affinity between the additive described above and the adhesive layer of the tape, the additive described above more preferably contains at least one selected from the group consisting of $LiPO_2F2$ and $LiBC_2O_4F_2$.

In order to improve the affinity between the additive and the adhesive of the tape, the content of the additive in the nonaqueous electrolyte is preferably 0.01 mol/L or more, more preferably 0.1 mol/L or more, and further preferably 0.15 mol/L or more. In addition, in view of the solubility of the additive to the nonaqueous electrolyte, the content is preferably 1.0 mol/L or less, more preferably 0.5 mol/L or less, and further preferably 0.25 mol/L or less.

Next, the tape including the resin substrate and the adhesive layer will be described.

As the resin substrate, for example, a fluorine resin, a polyimide, a poly(phenylene sulfide), a poly(ether sulfone), a polyolefin, such as a polyethylene, or a polypropylene, or a poly(ethylene terephthalate) may be used. In particular, a polyolefin is preferable, and a polypropylene is more preferable.

The adhesive layer preferably contains, for example, at least one component selected from the group consisting of a rubber component, a silicone component, and an acrylic resin component. In particular, as the rubber component, for example, a synthetic rubber or a natural rubber may be used. As the synthetic rubber, for example, there may be mentioned a butyl rubber, a butadiene rubber, a styrene-butadiene rubber, an isoprene rubber, a neoprene, a polyisobutylene, an acrylonitrile-butadiene rubber, a styrene-isoprene block copolymer, a styrene-butadiene block copolymer, or a styrene-ethylene-butadiene block copolymer. As the silicone component, an organic compound having a polysiloxane structure may be used, and as a silicone polymer, for example, a peroxide curable silicone-based adhesive or an addition reaction type silicone-based adhesive may be mentioned. As the acrylic resin component, a polymer including an acrylic-based monomer, such as an acrylic ester or a methacrylic ester, may be used, and as the acrylic-based polymer, for example, there may be mentioned a homopolymer or a copolymer of an acrylic-based monomer, such as acrylic acid, methacrylic acid, methyl acrylate, methyl methacrylate, ethyl acrylate, ethyl methacrylate, propyl acrylate, propyl methacrylate, butyl acrylate, butyl methacrylate, octyl acrylate, octyl methacrylate, 2-ethylhexyl acrylate, or 2-ethylhexyl methacrylate.

In addition, in the adhesive, a cross-linking agent, a plasticizer, and/or a tackifier may also be contained.

Although the tape may have a width of 0.5 mm or more, in order to appropriately reduce the discharge consumption of the negative electrode covered with the tape, the width thereof is more preferably 1 mm or more and further preferably 1.5 mm or more. In addition, although the width of the tape may be 3 mm or less, in order to sufficiently suppress the decrease in discharge capacity (output capacity) of the battery, the width of the tape is more preferably 2.5 mm or less and further preferably 2 mm or less. In addition, the tape may be adhered to either one or both of the surfaces of the negative electrode facing each other.

As one mode of the present invention, a rate $S_t/S_n \times 100$ of an area $S_t$ of the tape to an area $S_n$ of the negative electrode is preferably 0.5% to 4%. In this case, the area $S_n$ of the negative electrode is the product of a width Wn and a length Ln of the negative electrode and is represented by $Sn=Wn \times Ln$. In addition, the area $S_t$ of the tape is the product of a width Wt and a length Lt of the tape and is represented by $St=Wt \times Lt$. When the $S_t/S_n \times 100$ is 0.5% or more, an effect of reducing the discharge consumption of the negative electrode under the tape becomes significant. In addition, when the $S_t/S_n \times 100$ is 4% or less, an effect of suppressing the decrease in discharge capacity (output capacity) of the battery becomes significant.

As one mode of the present invention, the nonaqueous electrolyte may contain at least one solvent having a viscosity of 1 mPa·s or less. By the structure as described above, the discharge characteristics of the lithium primary battery can be improved. As the solvent described above, dimethyl ether is particularly preferably contained, and in particular, 1,2-dimethoxyethane is preferable.

Hereinafter, although concrete embodiments of the present invention will be described, the following embodiments are simply some of concrete examples of the present invention, and the technical scope of the present invention is not limited thereto.

(Positive Electrode)

A positive electrode active material contains at least one selected from the group consisting of a manganese oxide and a graphite fluoride. As the positive electrode active material, a manganese dioxide may be used alone, or for example, a manganese oxide and a graphite fluoride may be used in combination by mixing. A battery containing a manganese dioxide realizes a relatively high voltage and has excellent pulse discharge characteristics. As the manganese dioxide, an electrolytic manganese dioxide processed by a neutralization treatment with ammonia, sodium, lithium, or the like is preferably used. Furthermore, a calcined electrolytic manganese dioxide further processed by calcination is preferably used. In particular, an electrolytic manganese dioxide is preferably calcined at 300° C. to 450° C. in air or oxygen for approximately 6 to 12 hours. The oxidation number of manganese contained in the manganese dioxide is typically tetravalent but is not limited to tetravalent and may be deviated therefrom to a certain extent. As a usable manganese dioxide, for example, $MnO$, $Mn_3O_4$, $Mn_2O_3$, $MnO_2$, or $MnO_3$ may be mentioned, and in general, the manganese dioxide is used as a primary component. The manganese dioxide may be in a mixed crystalline state including a plurality of crystalline states. In addition, when a non-calcined electrolytic magnesium dioxide is used, the degree of crystallinity thereof is increased by conditions of an electrolytic synthesis, and a manganese dioxide having a decreased specific surface area is preferably used. In addition, for example, a chemical manganese dioxide and/or a manganese dioxide may also be added when the amount thereof is small.

The positive electrode includes at least one positive electrode mixture layer containing the positive electrode active material and a positive electrode collector to which the positive electrode mixture layer is adhered. The positive electrode mixture layer is formed, for example, on one or both of the opposed surfaces of a sheet-shaped positive electrode collector (such as stainless steel-made expanded metal, net, or punched metal) so as to bury the positive electrode collector. As the positive electrode collector, for example, stainless steel, aluminum, or titanium may be used. The positive electrode mixture layer may contain, besides the positive electrode active material, a resin material, such as a fluorine resin, as a binding agent. The positive electrode mixture layer may also contain as an electrically conductive agent, an electrically conductive material, such as a carbon material.

As the binding agent, for example, a fluorine resin, rubber particles, an acrylic resin, or the like may be used. As the fluorine resin, for example, a polytetrafluoroethylene, a tetrafluoroethylene-hexafluoropropylene copolymer, or a poly(vinylidene fluoride) may be used. As the rubber particles, a styrene butadiene rubber (SBR) or a modified acrylonitrile rubber may be used. As the acrylic resin, for example, an ethylene-acrylic acid copolymer may be mentioned. The amount of the binding agent contained in a positive electrode mixture is more preferably 10 to 25 percent by mass, further preferably 12 to 23 percent by mass, and even further preferably 15 to 20 percent by mass. The binding agents may be used alone, or at least two types thereof may be used in combination.

As the electrically conductive agent, for example, a natural graphite, an artificial graphite, a carbon black, carbon fibers, or the like may be used. As the carbon black, for example, there may be mentioned acetylene black, Ketjen black, channel black, furnace black, lamp black, or thermal black. Those materials may be used alone, or at least two types thereof may be used in combination. The amount of the electrically conductive agent contained in the positive electrode mixture is, for example, 1 to 30 parts by mass with respect to 100 parts by mass of the positive electrode active material.

The positive electrode is formed, for example, as described below.

First, the manganese dioxide, the electrically conductive agent, and the binding agent are mixed together to prepare the positive electrode mixture. Although a method for mixing the manganese dioxide, the electrically conductive agent, and the binding agent is not particularly limited, for example, after a mixture obtained by dry or wet mixing of the manganese dioxide and the electrically conductive agent is filled in a stainless steel-made expanded metal functioning as a collector and is then pressed using rollers, cutting is performed to have a predetermined size, so that the positive electrode is obtained.

(Negative Electrode)

For the negative electrode, metal lithium or a lithium alloy, such as Li—Al, Li—Sn, Li—NiSi, or Li—Pb, is used. Those materials having a sheet shape each may be used as a negative electrode plate as it is. Among the lithium alloys, a Li—Al alloy is preferable. The content of a metal element other than lithium contained in the lithium alloy is, in order to secure the discharge capacity and to stabilize an internal resistance, preferably set to 0.05 to 15 percent by mass. The metal lithium or the lithium alloy is formed to have an arbitrary shape and thickness in accordance with the shape, dimensions, design performance, and the like of a final lithium primary battery.

FIG. 1 shows the structure of a negative electrode of a lithium primary battery according to an embodiment of the present invention. A negative electrode 21 has a shape extending in a longitudinal direction and a short direction. To one main surface of the negative electrode 21, a long tape 22 is adhered along the longitudinal direction thereof. The tape 22 includes a resin substrate and an adhesive layer and has a width of 0.5 to 3 mm. At one end portion of the negative electrode 21 in the longitudinal direction, a negative electrode lead 23 is fitted to extract a current. To the one end portion of the negative electrode 21 in the longitudinal direction at which the negative electrode lead 23 is fitted, a lead protective tape 24 is adhered. In addition, FIG. 1 shows the state in which the tape 22 is adhered to a rear surface of the negative electrode 21.

(Separator)

As the separator, a porous sheet formed from an insulating material which has a resistance against an internal environment of the lithium primary battery may be used. In particular, for example, a synthetic resin-made non-woven cloth or a synthetic resin-made fine porous film may be mentioned. As a synthetic resin used for the non-woven cloth, for example, there may be mentioned a polypropylene, a poly(phenylene sulfide), or a poly(butylene terephthalate). Among those mentioned above, a poly(phenylene sulfide) and a poly(butylene terephthalate) are excellent in high temperature resistance, solvent resistance, and liquid retention property. As a synthetic resin used for the fine porous film, for example, there may be mentioned a polyolefin resin, such as a polyethylene, a polypropylene, or an ethylene-propylene copolymer. The fine porous film may contain inorganic particles, if needed. The thickness of the separator is preferably, for example, 5 to 100 μm.

(Nonaqueous Electrolyte)

As the nonaqueous electrolyte, an electrolyte in which a lithium salt is dissolved as a solute in a nonaqueous solvent is used. For the nonaqueous solvent, an organic solvent, such as dimethyl ether, γ-butyrolactone, propylene carbonate, ethylene carbonate, or 1,2-dimethoxyethane, which is generally used for a nonaqueous electrolyte of a lithium primary battery may be used. Those solvents may be used alone, or at least two types thereof may be used in combination. In order to improve the discharge characteristics of the lithium primary battery, the nonaqueous solvent preferably contains a cyclic carbonate ester having a high boiling point and/or a chain ether having a low viscosity even at a low temperature. As the cyclic carbonate ester, at least one selected from the group consisting of propylene carbonate (PC) and ethylene carbonate (EC) is preferably contained, and PC is particularly preferable. The chain ether preferably has a viscosity of 1 mPa·S or less at 25° C. and particularly preferably contains dimethoxyethane (DME). In this case, the viscosity of the nonaqueous solvent may be measured at a constant temperature of 25° C. and a shear rate of 10,000 (1/s) using a small sample viscometer m-VROC manufactured by Rheo-Sense Inc.

As the solute, a lithium salt, such as $LiCF_3SO_3$, $LiClO_4$, $LiPF_6$, $LiR1SO_3$ (R1 represents a fluorinated alkyl group having 1 to 4 carbon atoms), or $LiN(SO_2R2)(SO_2R3)$ [R2 and R3 each independently represent a fluorinated alkyl group having 1 to 4 carbon atoms], may be contained. Those solutes may be used alone, or at least two types thereof may be used in combination. The total concentration of the solutes contained in the nonaqueous electrolyte is preferably 0.2 to 2.0 mol/L, more preferably 0.3 to 1.5 mol/L, and particularly preferably 0.4 to 1.2 mol/L.

(Cylindrical Battery)

Figure 2:
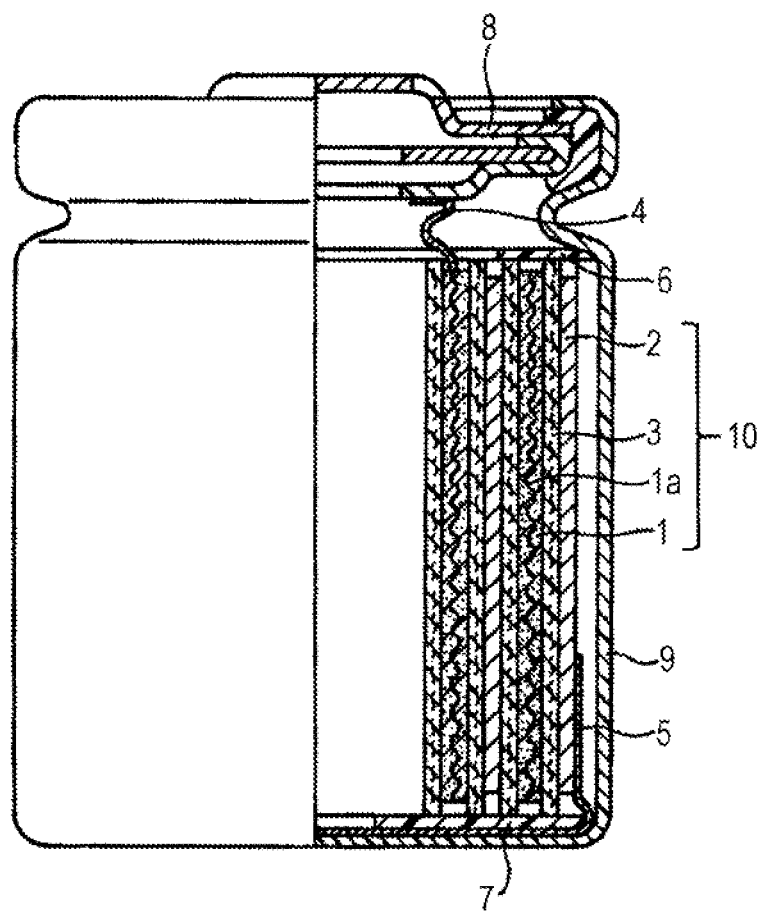
FIG. 2 is a partially cross-sectional front view showing a lithium primary battery according to an embodiment of the present invention.

FIG. 2 is a partially cross-sectional front view of a lithium primary battery according to an embodiment of the present invention. In the lithium primary battery, an electrode group 10 in which a positive electrode 1 and a negative electrode 2 are spirally wound with at least one separator 3 interposed therebetween is received in a battery case 9 together with a nonaqueous electrolyte (not shown). In addition, a sealing plate 8 is fitted to an opening portion of the battery case 9. To the sealing plate 8, a positive electrode lead 4 connected to a collector 1a of the positive electrode 1 is connected. A negative electrode lead 5 connected to the negative electrode 2 is connected to the case 9. In addition, on the top and the bottom of the electrode group 10, an upper insulating plate 6 and a lower insulating plate 7 each of which function to prevent an internal short circuit are disposed, respectively.

Hereinafter, with reference to Examples, the present invention will be described in more detail. However, the following Examples do not limit the present invention. In addition, in this example, a cylindrical lithium primary battery having the structure as shown in FIG. 2 was formed.

EXAMPLE 1

(1) Positive Electrode

First, 5 parts by mass of Ketjen black as an electrically conductive agent and 5 parts by mass of a polytetrafluoroethylene as a binding agent were mixed with 100 parts by mass of a manganese dioxide functioning as a positive electrode active material, so that a positive electrode mixture was prepared.

Next, the positive electrode mixture was allowed to pass together with a positive electrode collector formed from a ferrite-based stainless steel (SUS430)-made expanded metal having a thickness of 0.1 mm between a pair of rolling rollers to be rotated at equivalent rotation rates to fill the positive electrode mixture into pores of the expanded metal, and drying was then performed. Subsequently, rolling was performed using a roll press machine to have a thickness of 0.4 mm, and cutting was performed to obtain a predetermined dimension (width: 45 mm, length: 165 mm), so that a positive electrode plate was obtained. The positive electrode mixture was removed from a part of the positive electrode plate to expose the positive electrode collector, and a positive electrode lead was welded to this exposed portion. To an upper portion of the positive electrode lead, a lead protective tape is adhered in order to prevent a short circuit.

(2) Negative Electrode

A metal lithium plate having a thickness of 0.15 mm was cut to have a predetermined dimension (width: 42 mm, length: 190 mm), so that a negative electrode plate was prepared. A negative electrode lead was connected to the negative electrode plate. To an upper portion of the negative electrode lead, a lead protective tape was also adhered in order to prevent a short circuit. To one main surface of the negative electrode, a long tape was adhered along a longitudinal direction thereof. A resin substrate of the long tape was a polypropylene having a thickness of 40 μm, an adhesive layer was primarily formed from a rubber, and the tape had a width of 3 mm.

(3) Electrode Group

The positive electrode plate and the negative electrode plate were spirally wound with polypropylene-made separators each having a thickness of 25 μm interposed therebetween, so that a columnar electrode group was formed.

(4) Nonaqueous Electrolyte

Propylene carbonate (PC), ethylene carbonate (EC), and 1,2-dimethoxyethane (DME) were mixed together at a volume ratio of 4:2:2, so that a nonaqueous solvent was obtained. By using this nonaqueous solvent, a nonaqueous electrolyte was prepared which contained $LiCF_3SO_3$ as a solute at a concentration of 0.5 mol/L.

Furthermore, as an additive, $LiPO_2F_2$ was added to the nonaqueous electrolyte thus prepared. The content of $LiPO_2F_2$ in the nonaqueous electrolyte was 0.2 mol/L.

(5) Assembly of Cylindrical Battery

The electrode group thus obtained was provided with a ring-shaped lower insulating plate at a bottom portion thereof and was then inserted in a bottom-closed cylindrical battery case. Subsequently, the positive electrode lead connected to the positive electrode collector of the positive electrode plate was connected to an inner surface of a sealing plate, and the negative electrode lead connected to the negative electrode plate was connected to an inner bottom surface of the battery case.

Next, after the nonaqueous electrolyte was charged in the battery case, and an upper insulating plate was further disposed on the electrode group, an opening portion of the battery case was sealed with the sealing plate, so that, as shown in FIG. 2, a cylindrical lithium primary battery (battery A1) having a diameter of 14 mm and a height of 50 mm was formed.

EXAMPLE 2

Except for that the tape width was changed to 2 mm, a battery A2 was formed in a manner similar to that of Example 1.

EXAMPLE 3

Except for that the tape width was changed to 0.5 mm, a battery A3 was formed in a manner similar to that of Example 1.

EXAMPLE 4

Except for that the tape width was changed to 0.5 mm, and the additive was changed to $LiBC_2O_4F_2$, F a battery A4 was formed in a manner similar to that of Example 1.

EXAMPLE 5

Except for that the tape width was changed to 0.5 mm, and the tapes were adhered to two surfaces of the negative electrode, a battery A5 was formed in a manner similar to that of Example 1.

COMPARATIVE EXAMPLE 1

Except for that the tape width was changed to 5 mm, a battery B1 was formed in a manner similar to that of Example 1.

COMPARATIVE EXAMPLE 2

Except for that the tape width was changed to 4 mm, a battery B2 was formed in a manner similar to that of Example 1.

COMPARATIVE EXAMPLE 3

Except for that the tape width was changed to 5 mm, and no additive was used, a battery B3 was formed in a manner similar to that of Example 1.

COMPARATIVE EXAMPLE 4

Except for that the tape width was changed to 4 mm, and no additive was used, a battery B4 was formed in a manner similar to that of Example 1.

COMPARATIVE EXAMPLE 5

Except for that the tape width was set to 3 mm, and no additive was used, a battery B5 was formed in a manner similar to that of Example 1.

COMPARATIVE EXAMPLE 6

Except for that the tape width was changed to 2 mm, and no additive was used, a battery B6 was formed in a manner similar to that of Example 1.

COMPARATIVE EXAMPLE 7

Except for that the tape width was changed to 0.5 mm, and no additive was used, a battery B7 was formed in a manner similar to that of Example 1.

COMPARATIVE EXAMPLE 8

Except for that the tape width was changed to 4 mm, and the tapes were adhered to two surfaces of the negative electrode, a battery B8 was formed in a manner similar to that of Example 1.

COMPARATIVE EXAMPLE 9

Except for that the tape width was changed to 4 mm, the tapes were adhered to two surfaces of the negative electrode, and no additive was used, a battery B9 was formed in a manner similar to that of Example 1.

COMPARATIVE EXAMPLE 10

Except for that the tape width was changed to 0.5 mm, the tapes were adhered to two surfaces of the negative electrode, and no additive was used, a battery B10 was formed in a manner similar to that of Example 1.

COMPARATIVE EXAMPLE 11

Except for that no tape was used, a battery B11 was formed in a manner similar to that of Example 1.

(6) Battery Evaluation

After a constant resistance discharge (1 kgΩ) was performed on 10 batteries formed in each of Examples 1 to 5 and Comparative Examples 1 to 11, and a discharge capacity to 2 V was measured, the average value of the capacity (discharge capacity) with respect to a designed value was calculated from 10 batteries, and the results thereof are shown in Table 1. The degree of lithium breakage (negative electrode breakage) in Table 1 is as shown below.

◯: no lithium breakage occurs.
Δ: lithium breakage sometimes occurs.
x: lithium breakage inevitably occurs.

TABLE 1

| BATTERY | TAPE ARRANGEMENT | TAPE WIDTH (mm) | ADDITIVE | LITHIUM BREAKAGE | CAPACITY TO DESIGNED VALUE (%) |
|---|---|---|---|---|---|
| A1 | ONE SURFACE | 3 | $LiPO_2F_2$ | ◯ | 0 |
| A2 | ONE SURFACE | 2 | $LiPO_2F_2$ | ◯ | 0.5 |
| A3 | ONE SURFACE | 0.5 | $LiPO_2F_2$ | ◯ | 0.2 |
| A4 | ONE SURFACE | 0.5 | $LiBC_2O_4F_2$ | ◯ | 0 |
| A5 | TWO SURFACES | 0.5 | $LiPO_2F_2$ | Δ | 0 |
| B1 | ONE SURFACE | 5 | $LiPO_2F_2$ | ◯ | −1 |
| B2 | ONE SURFACE | 4 | $LiPO_2F_2$ | ◯ | −1 |
| B3 | ONE SURFACE | 5 | NO | ◯ | −1 |
| B4 | ONE SURFACE | 4 | NO | ◯ | −1 |
| B5 | ONE SURFACE | 3 | NO | Δ | 0 |
| B6 | ONE SURFACE | 2 | NO | x | ND |
| B7 | TWO SURFACES | 0.5 | NO | x | ND |
| B8 | TWO SURFACES | 4 | $LiPO_2F_2$ | ◯ | −2.5 |
| B9 | TWO SURFACES | 4 | NO | ◯ | −2.2 |
| B10 | TWO SURFACES | 0.5 | NO | x | −2.5 |
| B11 | NO TAPE | — | $LiPO_2F_2$ | x | ND |

From Table 1, it was found that when the tape was adhered to one surface of the negative electrode, the tape width was set to 0.5 to 3 mm, and as the additive to the nonaqueous electrolyte, $LiPO_2F_2$ or $LiBC_2O_4F_2$ was used, no lithium breakage occurred, and the capacity with respect to the designed value was not decreased. On the other hand, by all the batteries of Comparative Examples, the capacity with respect to the designed value was decreased.

When the tapes were adhered to the two surfaces of the negative electrode, the function as the collector of the negative electrode is likely to be maintained. However, when the adhesion position of the tape is shifted, it is believed that since an area inhibiting a negative electrode reaction is increased, the output capacity may be decreased with respect to the designed value in some cases. In addition, when the electrode plate is spirally wound, for example, the electrode plate may be elongated; however, when the tapes are adhered to the two surfaces thereof, compared to the case in which the tape is adhered only to the one surface, an elongation stress is not easily reduced in some cases. Hence, it is believed that the negative electrode is liable to be peeled away from the tape during the winding. Accordingly, it may be said that the tape is more preferably adhered only to the one surface of the negative electrode.

Next, after the negative electrode provided with the tape was immersed in the nonaqueous electrolyte, a peeling strength therebetween was evaluated.

EXAMPLE 6

A metal lithium plate having a thickness of 0.15 mm was cut to have a predetermined dimension (width: 42 mm, length: 195 mm), and a long tape was adhered to the metal lithium plate along a longitudinal direction thereof. A resin substrate of the long tape was a polypropylene having a thickness of 40 μm, an adhesive layer was primarily formed of a rubber, and the tape width was set to 10 mm. The metal lithium plate provided with the tape thus prepared was used as a test piece A6. After propylene carbonate (PC), ethylene carbonate (EC), and 1,2-eimethoxyethane (DME) were mixed together at a volume ratio of 4:2:2 as a nonaqueous solvent, and a nonaqueous electrolyte was prepared which contained $LiCF_3SO_3$ as a solute at a concentration of 0.5 mol/L, an additive was added thereto, so that a nonaqueous electrolyte to which $LiPO_2F_2$ was added to have a concentration of 0.2 mol/L was obtained.

The peeling strength between the metal lithium plate and the tape was measured using the test piece A6 thus formed (the number of samples: 10). For the measurement of the peeling strength, after an average peeling strength represented by F1 before immersion in the nonaqueous electrolyte and an average peeling strength represented by F2 after the immersion in the nonaqueous electrolyte at 25° C. for 1 hour were each obtained by a 90-degree peeling test in accordance with JIS K 6854, the rate of change in adhesion strength was obtained.

EXAMPLE 7

Except for that the primary component of the adhesive layer of the tape was changed to a silicone component, a test piece A7 was formed in a manner similar to that of Example 6.

EXAMPLE 8

Except for that the primary component of the adhesive layer of the tape was changed to an acrylic resin component, a test piece A8 was formed in a manner similar to that of Example 6.

EXAMPLE 9

Except for that as the primary component of the adhesive layer of the tape, a rubber component was used, and the additive to the nonaqueous electrolyte was changed to $LiBC_2O_4F_2$, a test piece A9 was formed in a manner similar to that of Example 6.

COMPARATIVE EXAMPLE 12

Except for that as the primary component of the adhesive layer of the tape, a rubber component was used, and no additive was used for the nonaqueous electrolyte, a test piece B12 was formed in a manner similar to that of Example 6.

COMPARATIVE EXAMPLE 13

Except for that the primary component of the adhesive layer of the tape was changed to a silicone component, and no additive was used for the nonaqueous electrolyte, a test piece B13 was formed in a manner similar to that of Example 6.

COMPARATIVE EXAMPLE 14

Except for that the primary component of the adhesive layer of the tape was changed to an acrylic resin component, and no additive was used for the nonaqueous electrolyte, a test piece B14 was formed in a manner similar to that of Example 6.

COMPARATIVE EXAMPLE 15

Except for that as the primary component of the adhesive layer of the tape, a rubber component was used, and the additive to the nonaqueous electrolyte was changed to PS (propane sulfone), a test piece B15 was formed in a manner similar to that of Example 6.

COMPARATIVE EXAMPLE 16

Except for that the primary component of the adhesive layer of the tape was changed to a silicone component, and the additive to the nonaqueous electrolyte was changed to PS (propane sulfone), a test piece B16 was formed in a manner similar to that of Example 6.

COMPARATIVE EXAMPLE 17

Except for that the primary component of the adhesive layer of the tape was changed to an acrylic resin component, and the additive to the nonaqueous electrolyte was changed to PS (propane sulfone), a test piece B17 was formed in a manner similar to that of Example 6.

COMPARATIVE EXAMPLE 18

Except for that as the primary component of the adhesive layer of the tape, a rubber component was used, and the additive to the nonaqueous electrolyte was changed to VC (vinylene carbonate), a test piece B18 was formed in a manner similar to that of Example 6.

COMPARATIVE EXAMPLE 19

Except for that the primary component of the adhesive layer of the tape was changed to a silicone component, and the additive to the nonaqueous electrolyte was changed to VC (vinylene carbonate), a test piece B19 was formed in a manner similar to that of Example 6.

COMPARATIVE EXAMPLE 20

Except for that the primary component of the adhesive layer of the tape was changed to an acrylic resin component, and the additive to the nonaqueous electrolyte was changed to VC (vinylene carbonate), a test piece B20 was formed in a manner similar to that of Example 6.

By a method similar to that of Example 6, the peeling strength between the metal lithium plate and the tape of the test piece of each of Examples 7 to 9 and Comparative Examples 12 to 20 was measured, and the rate of change in adhesion strength was obtained. The measurement results are shown in Table 2.

TABLE 2

| TEST PIECE | ADHESIVE MATERIAL | ADDITIVE | RATE OF CHANGE IN ADHESION STRENGTH (%) |
|---|---|---|---|
| A6 | RUBBER BASE | YES: LiPO$_2$F$_2$ | 0 |
| A7 | SILICONE BASE | YES: LiPO$_2$F$_2$ | 0 |
| A8 | ACRYLIC RESIN BASE | YES: LiPO$_2$F$_2$ | 0 |
| A9 | RUBBER BASE | YES: LiBC$_2$O$_4$F$_2$ | 0 |
| B12 | RUBBER BASE | NO | −40 |
| B13 | SILICONE BASE | NO | −38 |
| B14 | ACRYLIC RESIN BASE | NO | −24 |
| B15 | RUBBER BASE | YES: PS | −33 |
| B16 | SILICONE BASE | YES: PS | −30 |
| B17 | ACRYLIC RESIN BASE | YES: PS | −28 |
| B18 | RUBBER BASE | YES: VC | −37 |
| B19 | SILICONE BASE | YES: VC | −38 |
| B20 | ACRYLIC RESIN BASE | YES: VC | −30 |

From Table 2, when LiPO$_2$F$_2$ or LiBC$_2$O$_4$F$_2$ is used as the additive to the nonaqueous electrolyte, it is found that, regardless of the material of the adhesive of the tape, the adhesion strength of the negative electrode is not changed. On the other hand, in the batteries of Comparative Examples, as an additive which heretofore, has been known to improve a high temperature retention property in a nonaqueous electrolyte battery, a cyclic sultone derivative (such as PS) or a cyclic carbonate ester (such as VC) was used. By the batteries described above, the decrease in adhesion strength cannot be suppressed.

INDUSTRIAL APPLICABILITY

The lithium primary battery according to the present invention is preferably used for application in which an apparatus is driven for a long time. The lithium primary battery according to the present invention may be applied to a gas meter, a water meter, or the like.

REFERENCE SIGNS LIST 1 positive electrode
1a positive electrode collector
2, 21 negative electrode
3 separator
4 positive electrode lead
5, 23 negative electrode lead
6 upper insulating plate
7 lower insulating plate
8 sealing plate
9 battery case
10 electrode group
22 tape
24 lead protective tape

The invention claimed is:

1. A lithium primary battery comprising: a battery case; an electrode group received in the battery case; and a nonaqueous electrolyte,
wherein the nonaqueous electrolyte contains a nonaqueous solvent, a solute, and an additive,
the electrode group includes a positive electrode, a negative electrode, and a separator interposed therebetween, the positive electrode, the negative electrode, and the separator being spirally wound together,
the negative electrode includes foil composed of metal lithium or a lithium alloy, has a shape extending in a longitudinal direction and a short direction, and is provided with a long tape adhered to at least one main surface of the negative electrode along the longitudinal direction thereof,
the tape includes a resin substrate and an adhesive layer and has a width of 0.5 to 3 mm, and the additive is a lithium salt represented by the following formula (1)

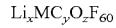

$Li_xMC_yO_zF_{60}$ where in the formula (1), $1 \leq x \leq 2$, $0 \leq y \leq 6$, $0 \leq z \leq 8$, $0 \leq \alpha \leq 6$, and $1 \leq y+z+\alpha$ are satisfied, y and z are not simultaneously 0, and the element M includes at least one of phosphorus and boron,
wherein the additive includes at least one selected from the group consisting of LiPO$_2$F$_2$ and LiBC$_2$O$_4$F$_2$,
wherein the resin substrate of the tape includes a polyolefin,
wherein the adhesive layer of the tape contains at least one selected from the group consisting of a rubber component, a silicone component, and an acrylic resin component, and
wherein a discharge capacity of the lithium primary battery is higher than a designed capacity by a rate of from 0% to 0.5%.

2. The lithium primary battery according to claim 1, wherein the additive includes an oxoacid salt.

3. The lithium primary battery according to claim 1, wherein the content of the additive in the nonaqueous electrolyte is 0.01 to 1.0 mol/L.

4. The lithium primary battery according to claim 1, wherein a rate $S_t/S_n \times 100$ of an area $S_t$ of the tape to an area $S_n$ of the negative electrode is 0.5% to 4%.

5. The lithium primary battery according to claim 1, wherein the nonaqueous electrolyte contains at least one solvent having a viscosity of 1 mPa·s or less at 25° C.

6. The lithium primary battery according to claim 5, wherein the solvent includes dimethyl ether.

7. The lithium primary battery according to claim 1, wherein the solvent includes dimethoxyethane.

8. The lithium primary battery according to claim 1, wherein the resin substrate of the tape is formed of polypropylene.

* * * * *